United States Patent
Sahoo et al.

(10) Patent No.: US 10,666,743 B2
(45) Date of Patent: May 26, 2020

(54) APPLICATION DISCOVERY BASED ON APPLICATION LOGS

(71) Applicant: VMWARE, INC., Palo Alto, CA (US)

(72) Inventors: Sidhartha Sahoo, Bangalore (IN); Vipul Chaudhary, Bangalore (IN); Sandeep L Hegde, Bangalore (IN); Arunvijai Sridharan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/959,321

(22) Filed: Apr. 23, 2018

(65) Prior Publication Data

US 2019/0327314 A1    Oct. 24, 2019

(51) Int. Cl.
```
H04L 29/08    (2006.01)
H04L 12/24    (2006.01)
G06F 9/455    (2018.01)
G06F 11/07    (2006.01)
G06N 20/00    (2019.01)
```

(52) U.S. Cl.
CPC .......... *H04L 67/16* (2013.01); *G06F 9/45558* (2013.01); *G06F 11/0712* (2013.01); *G06F 11/0778* (2013.01); *G06F 11/0787* (2013.01); *G06N 20/00* (2019.01); *H04L 41/5041* (2013.01); *G06F 2009/4557* (2013.01); *G06F 2009/45595* (2013.01)

(58) Field of Classification Search
CPC ........................................................ H04L 67/16
See application file for complete search history.

(56) References Cited

U.S. PATENT DOCUMENTS

| | | | |
|---|---|---|---|
| 10,178,067 B1 * | 1/2019 | Kumar | H04L 67/02 |
| 2014/0289198 A1 | 9/2014 | Chikkalingaiah | |
| 2015/0081978 A1 * | 3/2015 | Daly | G06F 12/0871 711/133 |
| 2016/0366021 A1 * | 12/2016 | Baron | H04L 41/065 |
| 2018/0321997 A1 * | 11/2018 | Palla | G06F 11/079 |

* cited by examiner

*Primary Examiner* — Suraj M Joshi (57) ABSTRACT

Techniques for discovery of applications based on application logs are disclosed. In one embodiment, a system may include a log analyzer to receive application logs generated by a plurality of applications running in a computing environment and analyze the received application logs using a trained initialization model to parse information about the plurality of applications. Further, the system may include an application discovery unit to determine a presence of an application running on a compute node in the computing environment using the parsed information about the plurality of applications.

21 Claims, 5 Drawing Sheets

APPLICATION DISCOVERY BASED ON APPLICATION LOGS

RELATED APPLICATIONS

The present application Ser. No. 15/959,321 is related in subject matter to U.S. patent application Ser. No. 15/959,314, which is incorporated herein by reference.

TECHNICAL FIELD

The present disclosure relates to computing environments, and more particularly to methods, techniques, and systems for discovery of applications based on application logs in the computing environments.

BACKGROUND

In computing environments such as networked computing environments, cloud computing environments, virtualized environments, and the like applications and processes may be comprised of multiple components operating on multiple devices. This is true particularly for enterprises that might be spread across multiple geographical locations. For example, a customer relationship management (CRM) system may utilize components such as a database, a web server, and a user application, each executing on a different compute node (e.g., a physical machine, a virtual machine, a container, and/or the like) in the computing environment. The compute nodes may be connected through a network. In such cases, it may be difficult to identify the applications running on a compute node in the large computing environments because of the scale and complexity involved in the infrastructure.

The drawings described herein are for illustration purposes only and are not intended to limit the scope of the present subject matter in any way.

DETAILED DESCRIPTION

Embodiments described herein may provide an enhanced computer-based and network-based method, technique, and system for application discovery through application logs. Application discovery may refer to a process of identifying applications and associated components (e.g., processes, threads, and the like) running in a computing system (e.g., an enterprise system) of a computing environment. The computing environment may be a networked computing environment such as an enterprise computing environment, a cloud computing environment, a virtualized environment, a cross-cloud computing environment, or the like. With evolving network growth and matured computation virtualization techniques, enterprise applications have become more complex. In such computing environments, discovering of the applications running on computer systems may be difficult because of the scale and complexity involved in such infrastructures.

Some methods for application discovery may include installing an agent on each physical server to monitor events reported by applications and forward events to a central application management server. The application management server may, then, analyze the application events in a data center and discover the applications running on the data center. Some other methods may install an agent on every physical server to sniff network traffic to/from the server and send the traffic logs to a central application server. The application server may analyze these traffic logs to discover the applications and/or generate application dependencies. However, the agents deployed on the physical servers may consume additional computing resources, generate overhead, provide less security (e.g., as the agents may need to run with administrative privileges to be able to discover processes and services from all users), include complex life cycle management, and/or may not capture services protected by rootkit.

In some other methods, the applications themselves may expose application programming interfaces (APIs). However, such methods may be less scalable, include capabilities limited to what can be achieved by running system scripts or application APIs, include complex life cycle management, and/or may not capture services protected by rootkit.

Examples described herein may eliminate the need for installing software program/agent on compute nodes to perform the application discovery. Examples described herein may perform the application discovery using application logs/log files generated by the applications. The applications running inside a compute node may have associated log files. Such log files may have information logged about the application instantiation or information about starting the application.

Examples described herein may receive the application logs generated by various types of applications running in a computing environment, analyze the received application logs using a trained initialization model to parse information about the plurality of applications, and determine a presence of an application running on a compute node in the computing environment using the parsed information. Examples described herein may employ machine learning and natural language processing techniques to train the initialization model which can periodically scan the application logs for initialization events of the applications. The term "initialization model" may refer to a bot (e.g., a piece of software) that can execute commands to perform routine tasks either automatically or with minimal human intervention. The initialization model may be trained to determine the applications through associated application logs when the applications are in the starting or initialization phase.

System Overview and Examples of Operation

Figure 1:
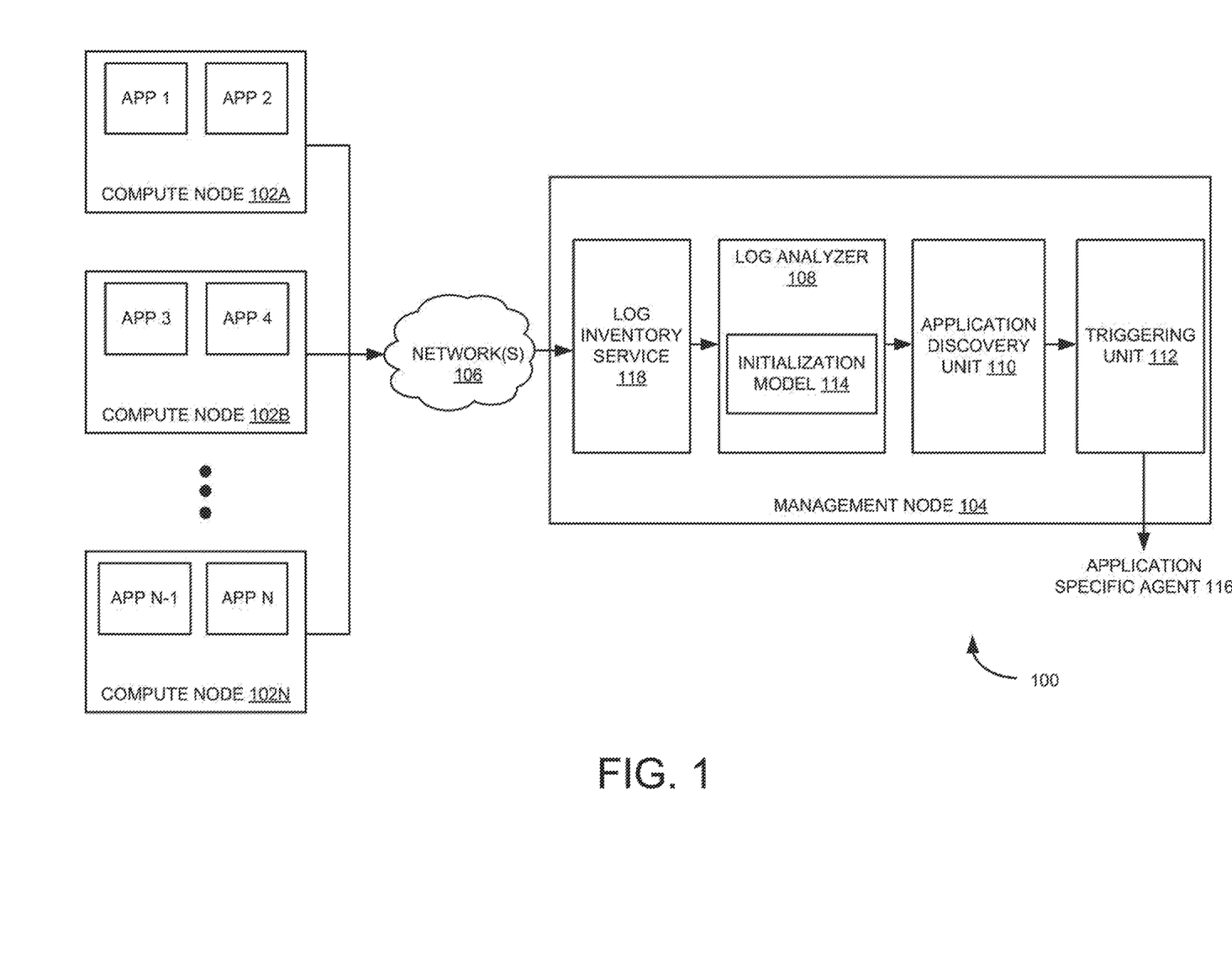
FIG. 1 is a system view of an example computing environment illustrating an application discovery unit to determine presence of an application through application logs.

FIG. 1 is a system view of an example computing environment 100 illustrating an application discovery unit to determine a presence of an application through application logs. As shown in FIG. 1, computing environment 100 may include multiple compute nodes 102A-N and a management node 104 that is in communication with compute nodes 102A-N over one or more networks 106. Each compute node 102 may refer to a computing device or computer program (i.e., executing on a computing device) that requests services from management node 104.

Example compute nodes 102A-N may include, but not limited to, physical computing devices, virtual machines, containers, or the like. The virtual machines, in some embodiments, may operate with their own guest operating systems on a physical computing device using resources of the physical computing device virtualized by virtualization software (e.g., a hypervisor, a virtual machine monitor, and the like). A container is a data computer node that runs on top of a host OS without the need for a hypervisor or separate OS. Management node 104 may refer to a computing device or computer program (i.e., executing on a computing device) that provides some service to compute nodes 102A-N or applications (e.g., app 1 to app N) executing on compute nodes 102A-N. Compute nodes 102A-N and management node 104 may communicate over communication links (e.g., networks 106). Communication is according to a protocol, which may be a message-based protocol.

Example network 106 can be a managed Internet protocol (IP) network administered by a service provider. For example, network 106 may be implemented using wireless protocols and technologies, such as Wi-Fi, WiMAX, and the like. In other examples, network 106 can also be a packet-switched network such as a local area network, wide area network, metropolitan area network, Internet network, or other similar type of network environment. In yet other examples, network 106 may be a fixed wireless network, a wireless local area network (LAN), a wireless wide area network (WAN), a personal area network (PAN), a virtual private network (VPN), intranet or other suitable network system and includes equipment for receiving and transmitting signals. Network 106 can also have a hard-wired connection to compute nodes 102A-N.

In some examples, compute nodes 102A-N may include processing resources/processors and memories, respectively. Example processor can be any custom made or commercially available processor, a central processing unit (CPU), an auxiliary processor among several processors associated with compute nodes 102A-N, a semiconductor-based microprocessor (in the form of a microchip or chip set, for example), a macroprocessor, or generally any device for executing computer-readable program code. Example memory may be a computer-readable storage medium. In some examples, memory can have a distributed architecture, where various components are situated remote from one another, but can be accessed by compute nodes 102A-N. Processors may be configured to execute software stored within associated one of memories, to communicate data to and from the memory, and to generally control operations of compute nodes 102A-N pursuant to the computer-readable program code. Example non-transitory computer readable medium is an electronic, magnetic, optical, or other physical device or means that can contain or store a computer program for use by or in connection with a computer related system. The computer-readable program code in the non-transitory computer-readable medium may include one or more separate programs and may be in the form of a source program, executable program (object code), script, or any other entity comprising a set of instructions to be performed.

Examples described in FIG. 1 may depict management node 104 in communication with multiple compute nodes 102A-N, however, in some examples, a group of management nodes or a cluster of management nodes can communicate with multiple compute nodes 102A-N over one or more networks 106 to provide services to compute nodes 102A-N.

Further, numerous types of applications may be supported on computing environment 100. For example, computing environment 100 may include a plurality of applications (i.e., app 1 to app n) running on corresponding compute nodes 102A-N. Example application may include a multi-tier application. The multi-tier application may be distributed across several compute nodes for execution. The applications may generate application logs including information about the activities performed by the applications to facilitate technical support and troubleshooting of the applications. The application logs may be sent to management node 104 for further analysis.

Management node 104 may include a log analyzer 108, an application discovery unit 110, and a triggering unit 112. During operation, log analyzer 108 may receive application logs generated by applications (app 1 to app n) running on compute nodes 102A-N in computing environment 100. In one example, applications (app 1 to app n) may run in a single cloud or distributed across multiple clouds. In some examples, log analyzer 108 may receive the application logs from a log inventory service 118, for instance, residing in management node 104. In one example, log inventory service 118 may be used to index the application logs generated by the plurality of applications.

Further, log analyzer 108 may analyze the received application logs using a trained initialization model 114 to parse information about applications (app 1 to app n). In one example, initialization model 114 may be trained on input words and/or strings of words using machine learning and natural language processing methods. For example, input words and/or the strings of words may be selected from historical application logs.

Furthermore, application discovery unit 110 may determine presence of an application (e.g., app 3) running on a compute node (e.g., compute node 102B) in computing environment 100 using the parsed information about applications (app 1 to app n). In addition, the application discovery unit 110 may determine individual components (e.g., processes, threads, and the like) of the application (e.g., app 3) using the parsed information upon determining the presence of the application (e.g., app 3). In one example, determining the presence of the application may include determining characteristics/configuration details of the application such as compute node, cluster details, communication port, network activity, resource universal unique identifier (UUID), resource identifiers, resource location, application name, application identifiers, resource name, custom properties, and/or the like.

Figure 2:
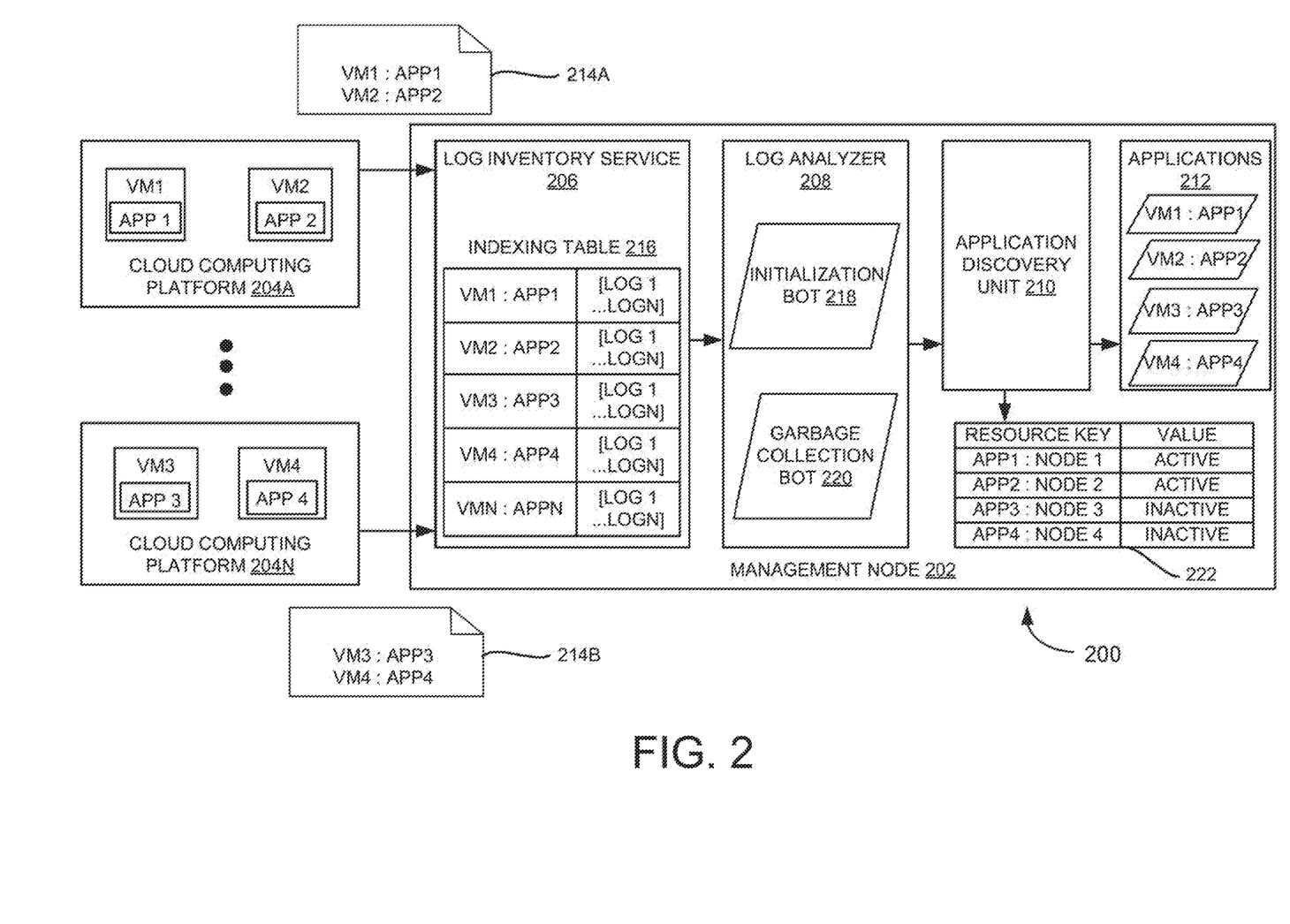
FIG. 2 is a block diagram of an example system for application discovery through application logs in a multi-cloud environment.

In one example, application discovery unit 110 may store a state indicative of the presence of the application. The state indicative of the presence of the application may be determined as "active" by analyzing the application logs associated with the determined application (e.g., app 3) using trained initialization model 114. In other examples, log analyzer 108 may determine the application as inactive by analyzing the application logs using a trained garbage collection model (e.g., garbage collection bot 220 as shown in FIG. 2). For example, log analyzer 108 may use the trained garbage collection model to check for disconnection events such as a "stop service" and mark the node (e.g., corresponding to the discovered application) as "inactive". Also, the garbage collection model may be used to clean up the node marked as inactive. Example garbage collection model is explained in FIG. 2.

Upon determining the presence of the application, triggering unit 112 may activate an application specific agent 116 associated with the application. Application specific agent 116 may refer to a management software associated with the application to perform management functions. Application specific agent 116 may reside in management node 104 or in any other compute node 102 (e.g., VM) associated with the determined application and accessible via network 106. Application specific agent 116 may deploy, advance monitor, and/or manage the application discovered by application discovery unit 110, for instance, using an application programming interface associated with the determined application. In some examples, application specific agent 116 may deploy, advance monitor, and/or manage a selected one of the discovered applications. In one example, the application may be monitored for health, connections, and/or resource usage. Example resource usage may be associated with at least one resource such as a processor, a memory, a network hardware, a bandwidth, or the like. In another example, application specific agent 116 may manage the application to perform a management function on the application based on the advance monitoring. For example, application specific agent 116 may generate an alert, define a condition for triggering an alert, managing access rights, and/or troubleshoot the application based on a monitored condition of the application.

In one example, log analyzer 108, application discovery unit 110, and triggering unit 112 may be implemented as engines or modules comprising any combination of hardware, firmware, programming, or a combination thereof to implement the functionalities described herein. Management node 104 can be a service process in the management application or can be an appliance running in the data center to cater multiple management applications in a cloud-based environment. For example, management application may be vSphere virtual center that is offered by VMware. Management application may be hosted or deployed in a physical server, VM, or container.

In some examples, the functionalities described herein, in relation to instructions to implement functions of log analyzer 108, application discovery unit 110, and triggering unit 112 and any additional instructions described herein in relation to the storage medium, may be implemented as engines or modules comprising any combination of hardware and programming to implement the functionalities of the modules or engines described herein. The functions of log analyzer 108, application discovery unit 110, and triggering unit 112 may also be implemented by a respective processor. In examples described herein, the processor may include, for example, one processor or multiple processors included in a single device or distributed across multiple devices.

FIG. 2 is a block diagram of an example system 200 for application discovery through application logs in a multi-cloud environment. As shown in FIG. 2, system 200 may include a management node 202 and cloud computing environments (i.e., cloud computing platforms 204A-N) that are in communication with management node 202. Management node 202 may refer to a computing device or computer program (i.e., executing on the computing device), that provides some service to compute nodes (e.g., VM1-VM4) of cloud computing platforms 204A-N. Management node 202 may connect to cloud computing platforms 204A-N either directly or over a network (e.g., over a local-area network, wide-area network, wireless network, or the like).

As shown in FIG. 2, system 200 may support multiple cloud computing platforms 204A-N, available to multiple enterprises in single-tenant and multi-tenant configurations. In one example, cloud computing platforms 204A-N may be provided by different cloud service providers. For example, each cloud computing platform 204 may include, but not limited to, Amazon Web Services (AWS), Google Cloud Platform, Windows Azure, OpenStack, or any other cloud computing platform. In some examples, VMs may be created and run in the AWS such as Amazon Elastic Compute Cloud (EC2).

Each cloud computing platform 204 may be operated by a cloud computing service provider and exposed as a service available to tenants (e.g., account holders), such as enterprises. In some examples, cloud computing platform 204 may be configured to dynamically provide an enterprise or users with one or more virtual data centers in which a user may provision VMs, deploy multi-tier applications on VMs, and/or execute workloads. Cloud computing platform 204 may include an infrastructure platform upon which a cloud computing environment may be executed. The term "multi-tier application" may refer to an application in which different functions of the application are logically separated (e.g., using different VMs and/or VM clusters) to handle different tasks or functions of the application.

As shown in FIG. 2, VMs (i.e., VM1 to VM4) may be deployed within cloud computing platforms 204A-N to provide infrastructure services, IT management services, and other infrastructure-related functions to tenants. Further, VMs (VM1 to VM4) running on different cloud computing platforms 204A-N may be centrally managed by management node 202. Even though FIG. 2 depicts two VMs running in each cloud computing platform 204, in some examples, multiple VMs can be deployed in each cloud computing platform 204. In other examples, containers can also be deployed in each cloud computing platform 204. Further, the VMs and/or containers may execute applications running therein.

Examples described herein can also be implemented in a hybrid computing environment, which may include several clusters of individual physical machines with each physical machine supporting hundreds of virtual machines (VMs) or containers. In the hybrid computing environments, each application is an executable computer software running on either physical machines, containers, or virtual machines.

Examples described herein can also be implemented in cross cloud computing platforms, where different VMs or containers may run on various types/flavors/versions of OS. The format and content of the application logs may be determined by a developer of the application. For example, an application log may refer to a file of events that are logged by an application (i.e., software application). The application log may include errors, informational events, warnings, and/or the like.

In one example, management node 202 may include a log inventory service 206, a log analyzer 208, and an application discovery unit 210. As shown in FIG. 2, application logs 214A and 214B including the relevant communication information may be collected and indexed in log inventory service 206. Log inventory service 206 may provide subscribed end-points to index application logs 214A and 214B generated by applications (app 1 to app 4). Log inventory service 206 may maintain an indexing table 216, which includes a hash-based data structure where each entry associated with application logs 214A and 214B may maintain a resource key to identify a host application and a value as a list of log files. An example data structure of the resource key may include:

| Resource UUID | Resource identifiers | Resource location | Application name | Application identifiers | Resource name | Custom properties |
|---|---|---|---|---|---|---|

Further, log analyzer 208 may loop through the application logs from log inventory service 206 and parse the relevant information about the applications. In one example, log analyzer 208 may use a trained initialization bot (I-Bot) 218 and a trained garbage collection bot (G-bot) 220 to look for the application initialization, instantiation, and connection/disconnection messages such as "listening on http://<fqdn>:<port>", "New Node added", "Starting service", "Stopping Service", and the like. The terms "initialization bot" and "initialization model" are used interchangeably throughout the document. Further, the terms "garbage collection bot" and "garbage collection model" are used interchangeably throughout the document. Once initialization bot 218 and garbage collection bot 220 are trained, initialization bot 218 and garbage collection bot 220 can scan the real-time application logs to detect the presence or absence of the applications respectively. The training of initialization bot 218 and garbage collection bot 220 may be continued through machine learning and natural language processing methods, which can improve accuracy to investigate and parse the relevant data over time. The parsed information may, then, be sent to application discovery unit 210 to create nodes 212 corresponding to the applications and mark nodes 212 as active or inactive (e.g., as shown in a hash table 222).

Log analyzer 208 and application discovery unit 210 may be implemented as engines or modules comprising any combination of hardware, firmware, programming, or a combination thereof to implement the functionalities described herein.

During operation, log analyzer 208 may utilize initialization bot 218 to identify the application through associated application logs when the application is in the starting or initialization phase. An example flow chart for initialization bot 218 is explained in FIG. 3A.

Figure 3A:
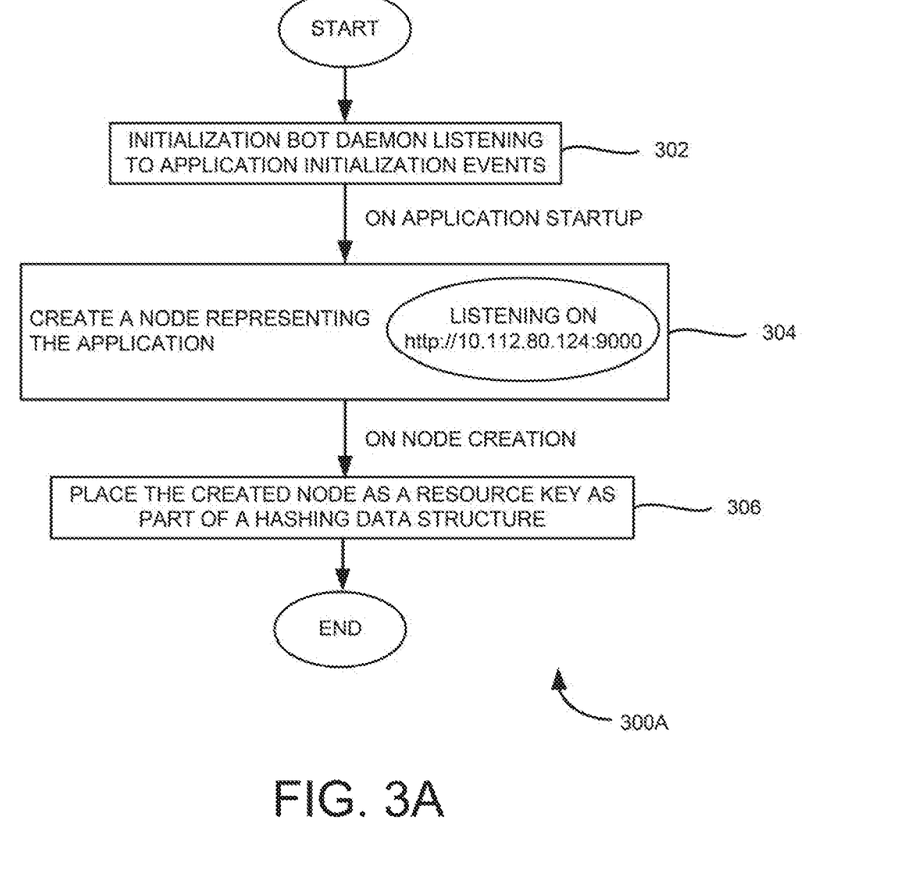
FIG. 3A is an example flow diagram illustrating identifying an application through applications logs during a start or initialization phase of the application.

Referring now to FIG. 3A, which is an example flow diagram 300A illustrating identifying an application through application logs during starting or initialization phase of the application. As depicted in FIG. 3A, a node may be created for each application that is identified by the initialization bot as follows. At 302, the initialization bot may listen to application initialization events. Upon starting an application, a node representing the application may be created, at 304. At 306, the created node (e.g., app 1: node 1, app 2: node 2, and the like) may be placed as a resource key as part of a hashing data structure in hash table (e.g., a hash table 222 of FIG. 2). The corresponding value for each node in hash table 222 may include the values either 'active' or 'inactive'.

For example, when a tomcat server starts, initialization bot 218 may be used to identify the fully qualified domain name/Internet protocol (FQDN/IP) and port where the tomcat server is running. In this example, initialization bot 218 may analyze tomcat logs to identify an application. In some examples, initialization bot 218 may be trained to create the application from associated application logs which may have pattern such as IP/Hostname/FQDN, port, the application name, and the like.

Referring back to FIG. 2, an example algorithm for initialization bot 218 to create the application is shown below:

```
Parse for initialization log messages;
For all initialization event of each application host H do
{if not NODE-EXISTS (H) then
    {CREATE-NODE (H);
    MARK-NODE-ACTIVE (H);
    }
}
```

Further, garbage collection bot 220 may be trained using machine learning techniques to go over the application logs and mark nodes (e.g., corresponding to the discovered applications) as "inactive". In one example, marking the node as "inactive" may signify that the discovered application is no longer running.

Garbage collection bot 220 may mark the node as "inactive" based on at least the following conditions:
1. When garbage collection bot 220 encounters "stop" or "deleted" events for the discovered application in the application logs; or
2. When garbage collection bot 220 doesn't get the application logs for the discovered application for a predefined interval of time.

Figure 3B:
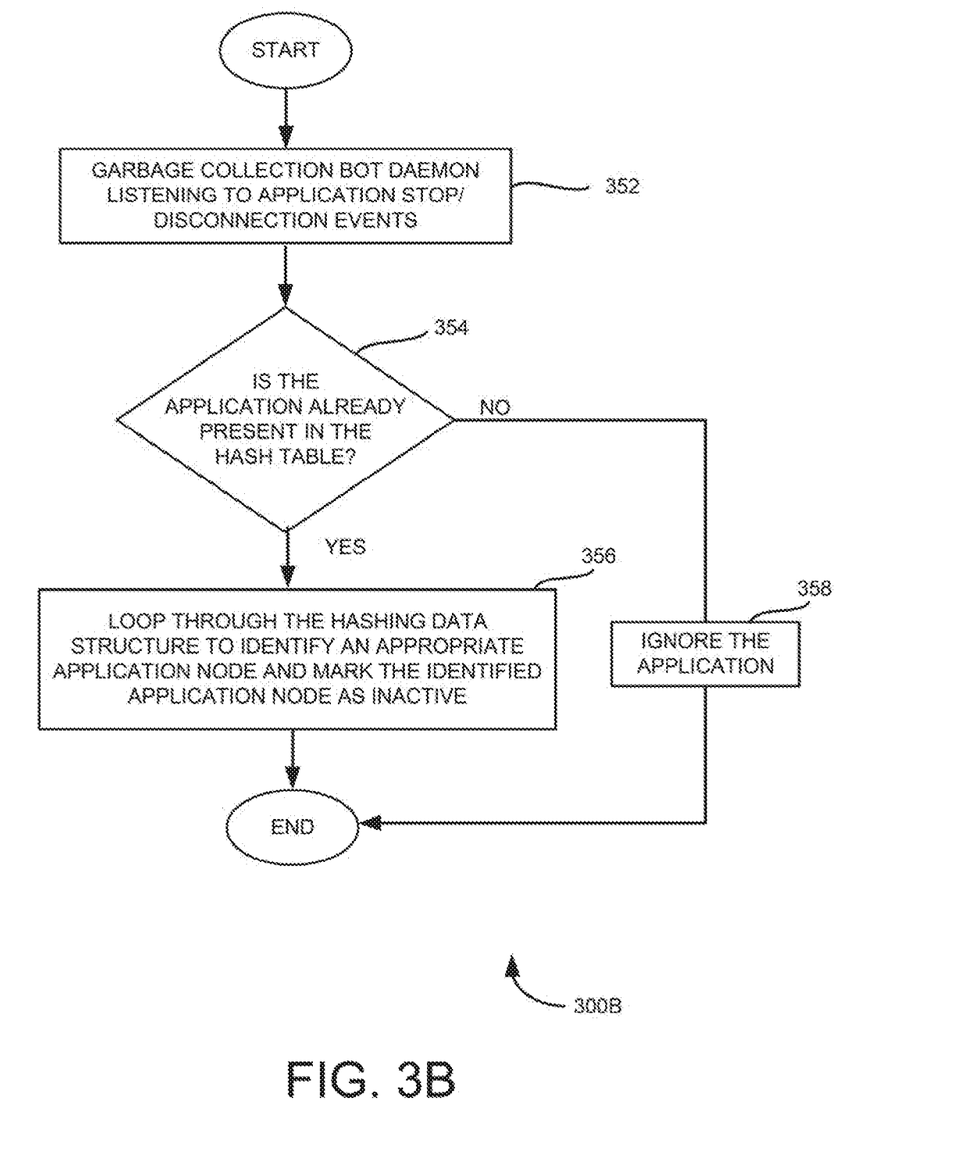
FIG. 3B is an example flow diagram illustrating marking an application node as inactive during an application stop/disconnection event.

An example flow chart for garbage collection bot 220 is explained in FIG. 3B. FIG. 3B is an example flow diagram 300B illustrating marking an application node as inactive during an application stop/disconnection event. The garbage collection bot 220 may run periodically and help in garbage collecting the nodes which are marked as inactive. The new nodes added by the initialization bot may be differentiated from the inactive nodes with the help of a flag which may be a part of every node.

At 352, garbage collection bot daemon (i.e., garbage collection bot 220) may listen to application stop/disconnection events. At 354, a check is made to determine whether the application is already present in the hash table. If the application is present in the hash table, at 356, the hashing data structure may be looped through to identify an appropriate application node (i.e., corresponding to the application) and mark the identified application node as inactive. If the application is not present in the hash table, at 358, the application may be ignored.

In some examples, management node 202 may include a triggering unit (e.g., triggering unit 112 as shown in FIG. 1) to periodically parse the hashing data structure in hash table 222 and deploy application specific agents to deploy, monitor, and/or manage the discovered applications.

Examples described herein may be implemented in client-server systems. For example, management node may be a vRealize™ Operations Manager (vROPS), Log Insight™, vRealize Automation®, vRealize Business, and/or Hyperic® that are offered by VMware. Examples described herein can be implemented in software as a service (SAAS), where the server communicating with multiple compute nodes (i.e., clients/agents/probes/slaves) could receive log files generated by the applications running on the multiple compute nodes.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 4:
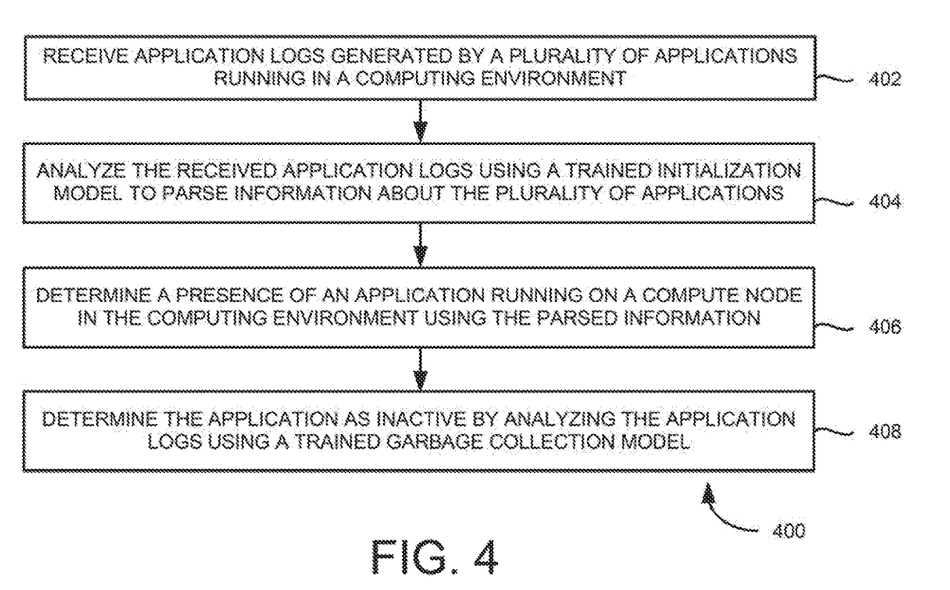
FIG. 4 is an example flow diagram illustrating determining a presence of an application running on a compute node in a computing environment using application logs.

FIG. 4 is an example flow diagram 400 illustrating determining a presence of an application running on a compute node in the computing environment using application logs. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, application logs generated by a plurality of applications running in a computing environment may be received by a log analyzer. In one example, the application logs generated by the plurality of applications may be indexed in a log inventory service. Further, the application logs are received by the log analyzer from the log inventory service. The plurality of applications may run on compute nodes in a single cloud or distributed across multiple clouds. Example compute node may include a virtual machine, a container, or a physical machine (e.g., physical server)

At 404, the received application logs may be analyzed by the log analyzer using a trained initialization model to parse information about the plurality of applications. In one example, the initialization model may be trained on input words and/or strings of words using machine learning and natural language processing methods. For example, the input words and/or the strings of words may be selected from historical application logs.

At 406, a presence of an application running on a compute node in the computing environment may be determined by an application discovery unit using the parsed information. In other examples, individual components of the application may be determined using the parsed information upon determining the presence of the application.

In one example, upon determining the presence of the application, a trigger may be generated to deploy, advance monitor, and/or manage the application in the computing environment. In some examples, management software or an application specific agent may be triggered to deploy, advance monitor, and/or manage the application using an associated application programming interface. In some examples, the application may be monitored for health, connections, resource usage, and/or the like. Further, the application may be managed to perform management functions on the application based on the advance monitoring. Example management functions may include alert generation, restarting, and/or troubleshooting the application based on the monitoring.

At 408, the application may be determined as inactive by analyzing the application logs using a trained garbage collection model. In one example, the garbage collection model may be trained on input words and/or strings of words using machine learning and natural language processing methods. In one example, the garbage collection model may be used to mark a node corresponding to the application as "inactive" and clean up the node marked as inactive.

Figure 5:
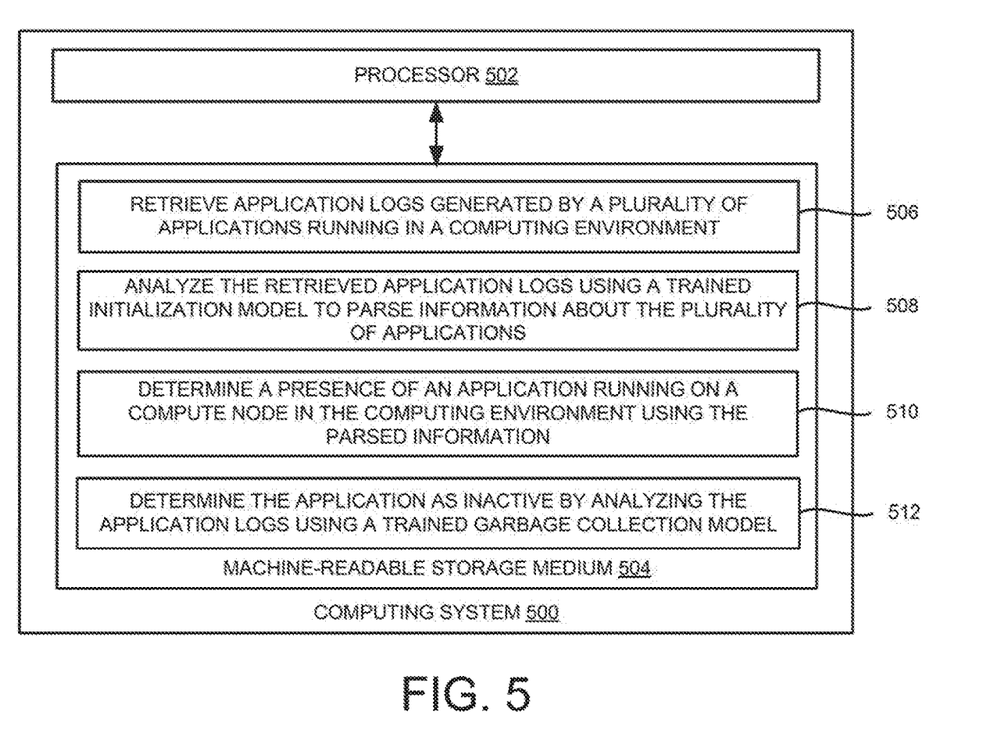
FIG. 5 is a block diagram of an example computing system including non-transitory computer-readable storage medium, storing instructions to discover applications through application logs.

FIG. 5 is a block diagram of an example computing system 500 (e.g., management nodes 104 and 202 of FIGS. 1 and 2, respectively) including non-transitory computer-readable storage medium, storing instructions to discover applications through application logs. The computing system 500 may include a processor 502 and a machine-readable storage medium 504 communicatively coupled through a system bus. The processor 502 may be any type of central processing unit (CPU), microprocessor, or processing logic that interprets and executes machine-readable instructions stored in the machine-readable storage medium 504. The machine-readable storage medium 504 may be a random-access memory (RAM) or another type of dynamic storage device that may store information and machine-readable instructions that may be executed by the processor 502. For example, the machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 504 may be a non-transitory machine-readable medium. In an example, the machine-readable storage medium 504 may be remote but accessible to computing system 500.

The machine-readable storage medium 504 may store instructions 506-512. In an example, instructions 506-512 may be executed by processor 502 for discovering application through application logs. Instructions 506 may be executed by processor 502 to retrieve application logs generated by a plurality of applications running in a computing environment. Instructions 508 may be executed by processor 502 to analyze the retrieved application logs using a trained initialization model to parse information about the plurality of applications. Instructions 510 may be executed by processor 502 to discover/determine a presence of an application running on a compute node in the computing environment using the parsed information. Further, machine-readable storage medium 504 may include instructions to trigger an application specific agent to deploy, monitor, and/or manage the application in the computing environment. Instructions 512 may be executed by processor 502 to determine the application as inactive by analyzing the application logs using a trained garbage collection model.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system comprising:
a processor; and
memory coupled to the processor, wherein the memory comprises:
a log analyzer to:
receive application logs generated by a plurality of applications running in a computing environment; and
parse the received application logs using a trained initialization model and a garbage collection model to detect information about the plurality of applications, wherein the initialization model and the garbage collection model are trained using machine learning and natural language processing methods to scan the application logs for an initialization event and/or a disconnection event of the plurality of applications, respectively; and an application discovery unit to;
determine a presence of an application running on a compute node in the computing environment using the detected information about the plurality of applications, wherein the trained initialization model is to determine a state indicative of the presence of the application as active by parsing the application logs associated with the determined application, and wherein the trained garbage collection model is to determine the state indicative of the presence of the application as inactive by parsing the application logs associated with the determined application.

2. The system of claim 1, further comprising:
a triggering unit to activate an application specific agent associated with the application, wherein the application specific agent is to deploy, advance monitor, and/or manage the application in the computing environment.

3. The system of claim 1, wherein the application discovery unit is to:
determine individual components of the application using the detected information upon determining the presence of the application.

4. The system of claim 1, wherein the application discovery unit is to:
store the state indicative of the presence of the application.

5. The system of claim 1, wherein the compute node comprises one of a virtual machine, a container, or a physical machine, and wherein the plurality of applications run in a single cloud or distributed across multiple clouds.

6. The system of claim 1, wherein the initialization model and the garbage collection model are trained on input words and/or strings of words using the machine learning and natural language processing methods, and wherein the input words and/or strings of words are selected from historical application logs.

7. The system of claim 1, further comprising:
a log inventory service to index the application logs generated by the plurality of applications, wherein the log analyzer is to receive the indexed application logs from the log inventory service.

8. The system of claim 1, wherein the trained garbage collection model is to determine the state indicative of the presence of the application as inactive when the garbage collection model encounters stop or deleted events for the determined application in the application logs.

9. The system of claim 1, wherein the trained garbage collection model is to determine the state indicative of the presence of the application as inactive when the garbage collection model does not get the application logs for the determined application for a predefined interval of time.

10. The system of claim 1, wherein the trained initialization model is to determine a state indicative of the presence of the application as active when the trained initialization model detects the initialization event for the determined application.

11. A method comprising:
receiving, by a log analyzer, application logs generated by a plurality of applications running in a computing environment;
parsing, by the log analyzer, the received application logs using a trained initialization model and a garbage collection model to detect information about the plurality of applications, wherein the initialization model and the garbage collection model are trained using machine learning and natural language processing methods to scan the application logs for an initialization event and/or a disconnection event of the plurality of applications, respectively;
determining, an application discovery unit, a presence of an application running on a compute node in the computing environment using the detected information;
determining a state indicative of the presence of the application as active by parsing the application logs associated with the determined application using the trained initialization model; and determining the state indicative of the presence of the application as inactive by parsing the application logs associated with the determined application using the trained garbage collection model.

12. The method of claim 11, further comprising:

generating a trigger to deploy, advance monitor, and/or manage the application in the computing environment.

13. The method of claim 12, wherein the application is monitored for health, connections, and/or resource usage, and wherein managing the application comprises performing a management function on the application based on the advance monitoring.

14. The method of claim 11, wherein the initialization model and the garbage collection model are trained on input words and/or strings of words using the machine learning and natural language processing methods, and wherein the input words and/or strings of words are selected from historical application logs.

15. The method of claim 11, comprising:

indexing the application logs generated by the plurality of applications in a log inventory service, wherein the application logs are received by the log analyzer from the log inventory service.

16. The method of claim 11, wherein the plurality of applications run in a single cloud or distributed across multiple clouds.

17. A non-transitory machine-readable storage medium encoded with instructions that, when executed by a processor, cause the processor to:

retrieve application logs generated by a plurality of applications running in a computing environment;

parse the retrieved application logs using a trained initialization model and a garbage collection model to detect information about the plurality of applications, wherein the initialization model and the garbage collection model are trained using machine learning and natural language processing methods to scan the application logs for an initialization event and/or a disconnection event of the plurality of applications, respectively;

determine a presence of an application running on a compute node in the computing environment using the detected information;

determine a state indicative of the presence of the application as active by parsing the application logs associated with the determined application using the trained garbage collection model; and determine the state indicative of the presence of the application as inactive by parsing the application logs associated with the determined application using the trained garbage collection model.

18. The non-transitory machine-readable storage medium of claim 17, further comprising instructions to:

trigger an application specific agent to deploy, monitor, and/or manage the application in the computing environment.

19. The non-transitory machine-readable storage medium of claim 17, comprising instructions to:

determine individual components of the application using the detected information upon determining the presence of the application.

20. The non-transitory machine-readable storage medium of claim 17 wherein the initialization model and the garbage collection model are trained on input words and/or strings of words using the machine learning and natural language processing methods, and wherein the input words and/or strings of words are selected from historical application logs.

21. The non-transitory machine-readable storage medium of claim 17, wherein the compute node comprises one of a virtual machine, container, or a physical machine, and wherein the plurality of applications run in a single cloud or distributed across multiple clouds in the computing environment.

* * * * *